(12) United States Patent
Mizuma et al.

(10) Patent No.: US 6,176,340 B1
(45) Date of Patent: Jan. 23, 2001

(54) BRAKE PEDAL APPARATUS FOR AUTOMOTIVE VEHICLE

(75) Inventors: Hiroyuki Mizuma; Tetsuya Ichikawa; Kazumi Sukeshita, all of Kanagawa-ken (JP)

(73) Assignee: Nissan Motor Co., Ltd., Kanagawa (JP)

( * ) Notice: Under 35 U.S.C. 154(b), the term of this patent shall be extended for 0 days.

(21) Appl. No.: 09/061,050

(22) Filed: Apr. 16, 1998

(30) Foreign Application Priority Data

Apr. 21, 1997 (JP) ................................... 9-103472
Jun. 13, 1997 (JP) ................................... 9-156840

(51) Int. Cl.⁷ ................................ B60T 1/00; G05G 1/14
(52) U.S. Cl. ............................ 180/274; 180/275; 74/512
(58) Field of Search ............................ 180/274, 275; 74/512, 513, 514, 522, 560

(56) References Cited

U.S. PATENT DOCUMENTS

| 4,641,733 | * | 2/1987 | Taig ................................... 192/13 A |
| 5,086,663 | * | 2/1992 | Asano et al. ............................ 74/512 |
| 5,615,749 | * | 4/1997 | Kato ..................................... 180/274 |
| 5,848,662 | * | 12/1998 | Sakaue ................................. 180/274 |
| 5,921,144 | * | 7/1999 | Williams, Jr. et al. ................. 74/512 |

FOREIGN PATENT DOCUMENTS

| 195 34 225 A1 | 3/1997 | (DE) . |
| 57-7743 | 1/1982 | (JP) . |
| 4-66370 | 3/1992 | (JP) . |
| 6-211115 | 8/1994 | (JP) . |
| 7-52809 | 2/1995 | (JP) . |
| 8-164782 | 1/1996 | (JP) . |
| 8-26083 | 1/1996 | (JP) . |
| 8-175346 | 7/1996 | (JP) . |
| 9-24844 | 1/1997 | (JP) . |
| 9-86255 | 3/1997 | (JP) . |

* cited by examiner

Primary Examiner—J. J. Swann
Assistant Examiner—Christopher Bottorff
(74) Attorney, Agent, or Firm—McDermott, Will & Emery

(57) ABSTRACT

When a collision detecting mechanism 27 detects a front collision of a vehicle, a clutch mechanism 18 integrally connecting a pedal arm 2 to a push rod lever 15 connecting a push rod 14 of a Master vac 13 is disconnected. Accordingly, even when the push rod 14 is backward moved together with the Master vac 13, the push rod lever 14 strikes the air, so that a collision load does not act on the pedal arm 2.

21 Claims, 5 Drawing Sheets

FRONT ⟵⟶ REAR

FRONT ←→ REAR

LEFT ←→ RIGHT

BRAKE PEDAL APPARATUS FOR AUTOMOTIVE VEHICLE

BACKGROUND OF THE INVENTION

1. Field of the Invention

This invention relates to a brake pedal apparatus for an automotive vehicle.

2. Description of the Related Art

A brake pedal apparatus for an automotive vehicle is, for example, as shown in Japanese Utility Model Unexamined Publication No. 6-1113, structured such that a pedal bracket supporting an upper end portion of a pedal arm in a freely rotatable manner is fastened to a dash lower panel and a lower surface portion of a dash upper panel connected to the dash lower panel and projecting to a vehicle cabin, and that a push rod connected to the upper end portion of the pedal arm is forward pressed by stepping on the pedal arm, thereby operating a Master vac.

When the Master vac or the dash lower panel fixing the Master vac is deformed to be backward move to the vehicle cabin at a time of a front collision of the vehicle, a rotational force in a direction inverse to a stepping direction is operated on the pedal arm through the push rod of the Master vac. Accordingly, a stepping position of the brake pedal is rearward shifted and there is a risk that a feeling of physical disorder is generated.

SUMMARY OF THE INVENTION

An object of the present invention is to provide a brake pedal apparatus for an automotive vehicle which can prevent a collision load from operating on a pedal arm through a push rod of a Master vac at a time of a front collision of a vehicle and can avoid a load from operating to a foot portion of a driver.

In order to achieve the object mentioned above, in accordance with the present invention, there is provided a brake pedal apparatus for an automotive vehicle, comprising:

a pedal bracket fixed to a dash panel;

a pedal arm supported by the pedal bracket in a freely rotatable manner;

a push rod lever supported by the pedal bracket in a freely rotatable manner and connected to a push rod; and a clutch mechanism integrally connecting the pedal arm to the push rod lever at a normal time, and disconnecting the pedal arm from the push rod lever when a collision detecting sensor detects a collision.

In accordance with the present invention, since the pedal arm and the push rod lever are integrally connected to each other by the clutch means at a normal state, the pedal arm and the push rod lever are integrally rotated by a stepping operation of the pedal arm. Accordingly, a Master vac operation which corresponds to an operation of a normal brake pedal apparatus can be performed.

On the contrary, when the vehicle collides frontward, the clutch means is operated by a detecting effect of the collision detecting means so as to disconnect the pedal arm from the push rod lever, so that the Master vac is rearward moved. Otherwise, even when the dash panel is deformed to the vehicle cabin so that the push rod of the Master vac is rearward moved, the push rod lever is rotated so as to strike the air. Accordingly, it can be avoided that the collision load is input to the pedal arm.

In the structure mentioned above, the pedal arm and the push rod lever may be supported by the pedal shaft provided in the pedal bracket. Further, any one of the push rod lever and the pedal arm may be supported in a freely slidable manner in an axial direction of the pedal shaft.

Further, the clutch mechanism may be constituted by engagement portions formed in the pedal arm and the push rod lever and engaging with each other, and a positioning mechanism which is positioned so that the engagement portions of the push rod lever and the pedal arm are engaged with each other at a normal time and is deformed when a load is over a predetermined value so as to allow any one of the push rod lever and the pedal arm to move so that an engagement between the engagement portions is removed in an axial direction of the pedal shaft.

In accordance with this structure, since the clutch mechanism is structured as a mechanical clutch construction by engagement portions formed in the pedal arm and the push rod lever and engaging with each other, and a positioning mechanism which is positioned so that the engagement portions of the push rod lever and the pedal arm are engaged with each other at a normal time and is deformed when a load is over a predetermined value so as to allow any one of the push rod lever and the pedal arm to move so that an engagement between the engagement portions is removed in an axial direction of the pedal shaft, a construction is simple and a cost thereof is advantageous.

The engagement portions may be formed on end surfaces of each of boss portions of the pedal arm and the push rod lever.

Further, the engagement portion may be constituted by a hook portion formed in any one of the pedal arm and the push rod lever, and the other front and rear side edges engaging with the hook portion.

Still further, the positioning mechanism may be constituted by a clutch arm supported by an arm shaft provided in the pedal bracket in parallel to the pedal shaft in a freely slidable manner in an axial direction and connected to any one of the push rod lever and the pedal arm, and a positioning member positioning the clutch arm to a predetermined position in an axial direction of the arm shaft and deformed when a load is over a predetermined value so as to allow the clutch arm to move in an axial direction.

In accordance with this structure, since the clutch arm of the positioning mechanism slides in the axial direction of the arm shaft which is in parallel to the pedal shaft, the push rod lever or the pedal arm can be smoothly slidden in the axial direction on the pedal shaft, so that the clutch operation can be smoothly performed.

Furthermore, the collision detecting sensor may be constituted so as to detect a rearward movement of the pedal bracket due to the collision load.

Moreover, the collision detecting sensor may comprises a collision detecting lever projecting from the pedal bracket and rotated by engaging a vehicle body or a vehicle body part positioned closer to the vehicle cabin than the dash panel in accordance with a rearward movement of the pedal bracket due to the collision load, and a cam mechanism moving the clutch arm in a direction that an engagement of the engagement portions is removed by the rotation of the collision detecting lever.

In accordance with this structure, since the collision detecting sensor is mechanically composed of the collision detecting lever and the cam portion, a construction is simple and a cost thereof is advantageous.

The collision detecting lever may be formed such as to be supported by the arm shaft in a freely rotatable manner, to be projected above the pedal shaft and to be rotated by engaging with a lower surface portion of a dash upper panel projecting to the vehicle cabin above a dash lower panel in accordance with a rearward movement of the pedal bracket due to the collision load.

In accordance with this structure, since the pedal bracket slides rearward with respect to the dash upper panel at a time of a front collision of the vehicle, a collision detecting operation that the collision detecting lever is rotated by the engagement with the lower surface portion of the dash upper panel can be securely performed.

Further, the cam mechanism may be structured so as to be formed on end surfaces of each of boss portions of the clutch arm and the collision detecting lever, to be engaged with each other, and to move the clutch arm in a direction that an engagement of the engagement portion is removed in an axial direction of the arm shaft against a positioning force of the positioning member by the rotation of the collision detecting lever.

Still further, the pedal bracket is provided with a restricting portion disposed near the collision detecting lever projecting from the pedal bracket, preventing the collision detecting lever from rotating in a normal state, and allowing the collision detecting lever to rotate when a rotating force is over a predetermined load.

In accordance with this structure, since the restricting portion can restrict a rotation of the collision detecting lever at a time of assembling the brake pedal apparatus to the vehicle, transporting and conveying, the collision detecting lever can be securely held in an initial set position. On the contrary, at a time of a front collision of the vehicle, since the rotation restriction by the restricting portion is removed in the case that the rotational force of the collision detecting lever is over a predetermined load, the collision detecting lever can be frontward rotated with no problem.

The positioning member may be constituted by a spring urging the clutch arm in an axial direction of the arm shaft.

Further, a return spring may be disposed between the pedal bracket and the push rod lever, thereby giving a rearward rotational force to the pedal arm through the push rod lever.

In accordance with this structure, since the urging force of the return spring acting on the pedal arm is removed by disconnecting the push rod lever from the pedal arm at a time of a front collision of the vehicle, a load acting on the leg portion of the driver can be removed.

Still further, the pedal bracket may be fixed to at least the dash lower panel, and the collision detecting lever may be engaged with the dash upper panel connected to the upper side of the dash lower panel and projecting to the vehicle cabin at a time of a rearward movement of the pedal bracket due to a collision load.

Furthermore, the dash panel may be constituted by a dash lower panel and a dash upper panel connected to the dash lower panel and projecting to the vehicle cabin, and the pedal bracket may be fixed so as to stride over the dash lower panel and the dash upper panel and may be fixed so as to rearward slide with respect to the dash upper panel at a time of a rearward movement of the pedal bracket due to the collision load.

In accordance with this structure, since the pedal bracket rearward slides with respect to the dash upper panel when the pedal bracket rearward moves at a time of a front collision of the vehicle, an upward motion of the pedal bracket is restricted by the dash upper panel, thereby preventing the pedal bracket from rearward moving toward a rear, diagonal and upper direction around the fixing point to the dash upper panel. As a result, the pedal bracket interferes with the steering member adjacently disposed in a rear and upper portion of the pedal bracket, so that the steering member is prevented from being deformed.

DETAILED DESCRIPTION OF THE PREFERRED EMBODIMENT

Figure 1:
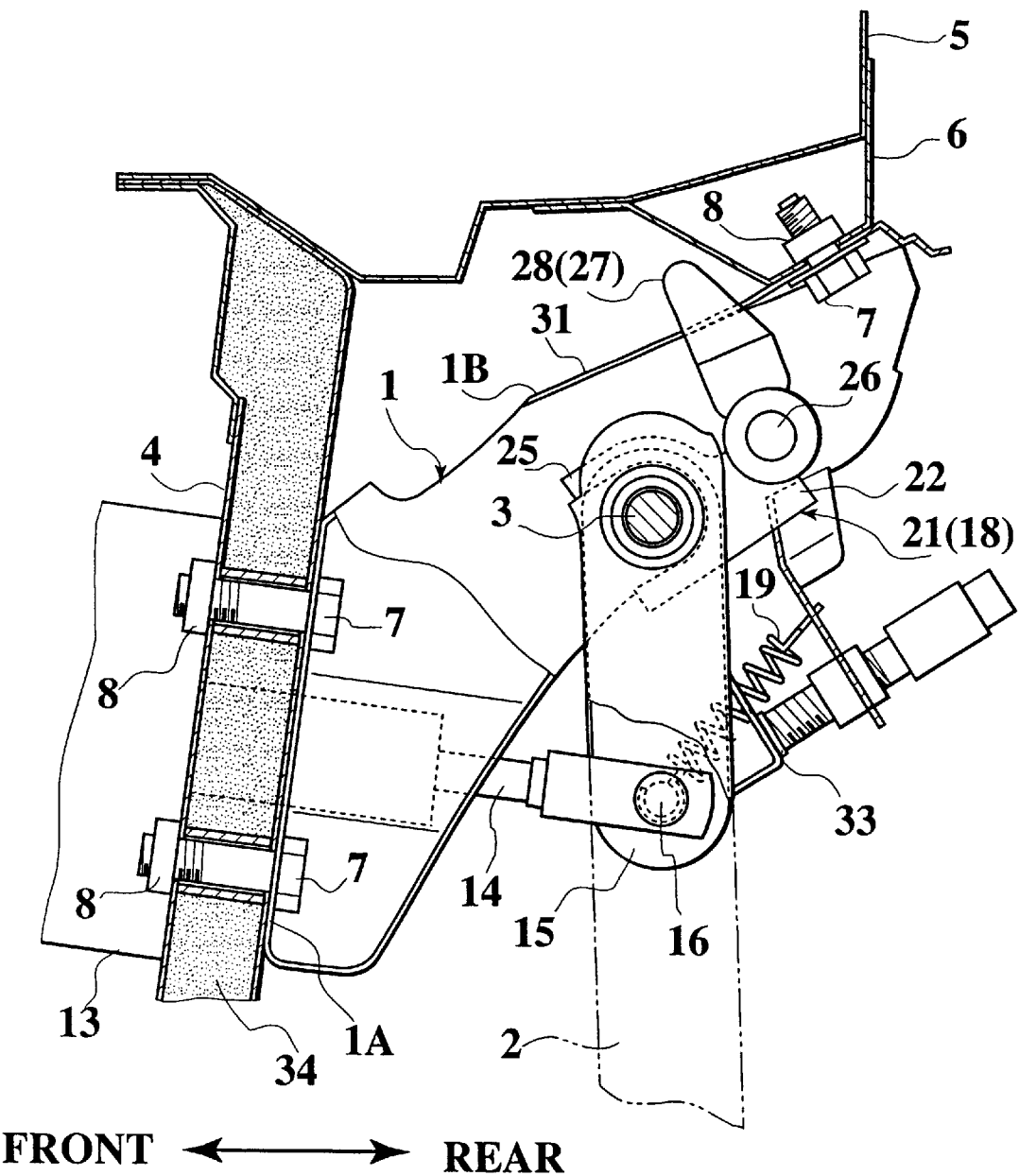
FIG. 1 is a side elevational view which shows an embodiment in accordance with the present invention.
Figure 2:
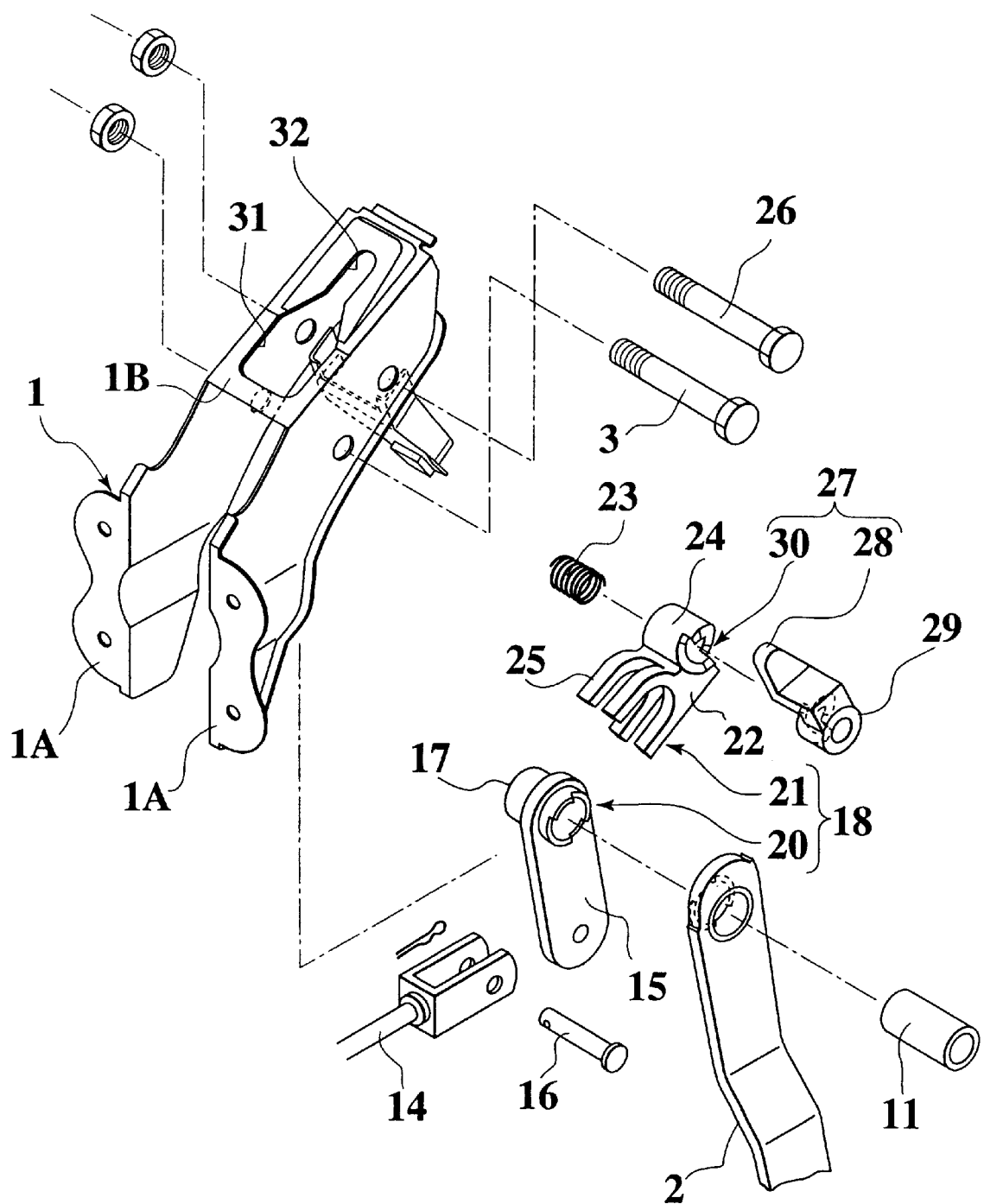
FIG. 2 is an exploded perspective view of the embodiment.

An embodiment in accordance with the present invention will be described in detail below with reference to the accompanying drawings.

In FIGS. 1 to 4, reference numeral 1 denotes a bracket, and reference numeral 2 denotes a pedal arm having an upper end portion supported by a pedal shaft 3 fixed to the pedal bracket 1 in a freely rotatable manner. The pedal arm is provided with a pedal pad (not shown) in a lower end thereof.

The pedal bracket 1 is formed so as to have a side surface of an inverted-L shape. A front wall 1A of the pedal bracket 1 is fastened to a dash lower panel 4 through a bolt 7 and a nut 8. A rear end portion of an upper wall 1B is fastened to a lower surface portion of a dash upper panel 5 connected to the dash lower panel 4 and projecting to the vehicle cabin, that is, concretely speaking, a vehicle body end bracket 6 connected and arranged between the lower surface of the dash upper panel 5 and the rear wall through the bolt 7 and the nut 8 in a forward inclined state.

A cylindrical collar 11 is fitted and arranged in the pedal shaft 3 through a bush 10. On the contrary, a cylindrical boss portion 12 is provided in an upper end portion of the pedal arm 2. The pedal shaft 3 is rotatably fitted to the collar 11 through the boss portion 12.

Reference numeral 13 denotes a Master vac fitted to a side surface close to an engine room of the dash lower panel 4 and generating an oil hydraulic pressure in a brake unit (not shown) by pressing a push rod 14 extending through the dash lower panel 4 in accordance with a stepping of the pedal arm 2.

The push rod 14 of the Master vac 13 is connected to a lower end of a push rod lever 15 supported by the pedal shaft 3 in a freely rotatable manner through a pin 16.

The push rod lever 15 is provided with a cylindrical boss portion 17 in an upper end portion thereof and is fitted to the collar 11 of the pedal shaft 3 through the boss portion 17 in a freely rotatable and slidable manner in an axial direction.

The pedal arm 2 and the push rod lever 15 are integrally connected by a clutch means 18 at a normal state. However, the pedal arm 2 and the push rod lever 15 can be disconnected by that the clutch means 18 is operated by a detecting operation of a collision detecting means mentioned below.

Further, in accordance with this embodiment, a return spring (a tension spring) 19 is arranged between the pin 16 of the push rod lever 15 and the pedal bracket 1, so that a rearward rotational force is given to the pedal arm 2 through the push rod lever 15.

In this embodiment, the clutch means 18 is provided with an engagement portion 20 formed on each of end surfaces opposing to each other of the boss portion 12 of the pedal arm 2 and the boss portion 17 of the push rod lever 15 and engaging with each other, and a positioning means 21 urging the push rod lever 15 in a direction that the engagement portion 20 is engaged, that is, toward the pedal arm 2 end in an axial direction of the pedal shaft 3.

The positioning means 21 is provided with a clutch arm 22 operating the push rod lever 15 in an axial direction of the collar 11, and a spring 23 serving as a positioning member pressing the clutch arm 22 to one side direction and urging the push rod lever 15 in an axial direction in which the engagement portion 20 engages.

The clutch arm 22 is provided with a cylindrical boss portion 24 and a fork portion 25. The boss portion 24 is fitted to an arm shaft 26 fixed to the pedal bracket 1 in parallel to the pedal shaft 3 through the boss portion 24 in a freely rotatable and slidable manner in an axial direction of the arm shaft 26. The fork portion 25 is engaged with the upper and lower portion of the boss portion 17 so as to stride over both the right and left side portions on the peripheral edge of the upper end portion of the push rod lever 15, and is connected thereto so as to move the push rod lever 15 in an axial direction of the collar 11.

Further, the compression spring 23 is elastically disposed between one side wall of the pedal bracket 1 and the boss portion 24 of the clutch arm 22 on the arm shaft 26.

Reference numeral 27 denotes a collision detecting means detecting a front collision of the vehicle and disconnecting the clutch means 18. In accordance with this embodiment, the collision detecting means 27 is provided with a collision detecting lever 28 supported by the arm shaft 26 through the boss portion 29 and having an upper end portion arranged near the front portion of the vehicle body end bracket 6 so as to project through a window portion 31 in the upper wall 1B of the pedal bracket 1, and a cam portion formed in each of the end surfaces opposing to each other of the boss portion 29 of the collision detecting lever 28 and the boss portion 24 of the clutch arm 22.

The collision detecting lever 28 is formed so as to engage the front surface of the vehicle body end bracket 6 so as to rotate when the pedal bracket 1 is rearward moved by the front collision of the vehicle, to move the clutch arm 22 in an axial direction of the arm shaft 26 against the spring force of the spring 23 by the cam portion 30 due to the rotation, and to remove an engagement of the engagement portion 20 of the clutch means 18. Accordingly, the spring 23 is formed so as to be deformed when the load is over a predetermined value.

Accordingly, the cam portion 30 is formed as an inclined surface having the same desired lead angle on the end surface of the boss portions 24 and 29 so as to be in close contact with each other.

Further, in accordance with this embodiment, a bolt through hole 32 formed in a long hole to a longitudinal direction in the upper wall 1B of the pedal bracket 1 is communicated with the window portion 31. Accordingly, when the collision input is operated to the pedal bracket 1 in a backward direction at a time of a front collision of the vehicle, the bolt through hole 32 slides rearward with respect to the vehicle body end bracket 6. Further, when the window portion 31 reach a standing position of the bolt 7, the window portion 31 comes out from the head portion of the bolt 7, and the pedal bracket 1 can separate from the vehicle end bracket 6.

In FIG. 1, reference numeral 33 denotes a stopper restricting a backward rotation of the pedal arm 2, and reference numeral 34 denotes a dash insulator provided in a side surface close to the vehicle cabin of the dash lower panel 4.

In accordance with the structure of the embodiment mentioned above, since in a normal state, the engagement portion 20 of the clutch means 18 is in an engaging state and integrally connects the pedal arm 2 to the push rod lever 15, the pedal arm 2 and the push rod lever 15 are integrally rotated by a stepping operation of the pedal arm 2. Accordingly, the apparatus can operates the Master vac 13 by pressing the push rod 14 in the same manner as that of a normal brake pedal apparatus.

On the contrary, when the vehicle frontward collides so that the Master vac 13 is interfered by the other functional part within the engine room, thereby being pressed rearward, or the dash lower panel 4 is interfered by the functional part within the engine room so that the dash lower panel 4 is deformed to the vehicle cabin and the pedal bracket 1 rearward moves together with a deformation of the dash lower panel 4 to the vehicle cabin, the collision detecting lever 28 of the collision detecting means 27 is engaged with the front surface of the vehicle body end bracket 6 so as to forward rotate.

When the collision detecting lever 28 forward rotates, the clutch arm 22 of the clutch means 18 moves on the arm shaft 26 in an axial direction against the spring force of the spring 23 and the push rod lever 15 is moved in a direction that an engagement of the engagement portion 20 is removed by the clutch arm 22, so that the push rod lever 15 is disconnected from the pedal arm 2.

As a result, even when the rearward pressing force is operated on the push rod lever 15 by the push rod 14 caused by the rearward movement of the Master vac 13, only the push rod lever 15 strikes at the air and the collision load is not input to the pedal arm 2. Accordingly, it is avoided that a feeling of physical disorder is generated due to a load application to the foot of the driver stepping on the pedal arm 2 and that a shock is affected.

Particularly, in accordance with this embodiment, since the return spring 19 of the pedal arm 2 is arranged so as to stride over the pin 16 connecting the push rod 14 disposed in the lower end portion of the push rod lever 15 and the pedal bracket 1, the push rod lever 15 immediately rotates to a non-engaging position of the engagement portion 20 by a rearward urging force of the return spring 19 so as to make the pedal arm 2 free when the clutch means 18 is disconnected in a manner mentioned above. Further, since the urging force of the return spring 19 to the pedal arm 2 is removed, the load does not act on the foot of the driver.

In this case, as mentioned above, when the vehicle frontward collides and the pedal bracket 1 is backward moved, the pedal bracket 1 is provided with the bolt through hole 32 provided in the upper wall 1B and the window portion 31 projecting the collision detecting lever 28 upward in a continuous manner and the pedal bracket 1 is fixed so as to rearward slide with respect to the vehicle body end bracket 6. Accordingly, the collision detecting operation can be securely performed by rapidly rotating the collision detecting lever 28 in accordance with the rearward slide of this pedal bracket 1.

Further, when the pedal bracket 1 is rearward slidden so that the window portion 31 reaches a standing position of the bolt 7, the window portion 31 comes out from the head portion of the bolt 7, so that the pedal bracket 1 is removed from the vehicle body end bracket 5. Accordingly, the bracket 1 is prevented from backward moving toward a rear, diagonal and upward direction around the fixing point to the vehicle body end bracket 5. Further, the pedal bracket 1 can be prevented from being interfered with the steering member (not shown) adjacently disposed above the rear portion of the pedal bracket 1 so that the steering member is deformed.

Still further, as well as the collision detecting means 27 is mechanically constituted by the collision detecting lever 28 supported by the arm shaft 26 and the cam portion 30, the clutch means 18 is also mechanically constituted by the engagement portion 20, the clutch arm 22 supported by the arm shaft 26 and the positioning means comprising the spring 23. Accordingly, the construction can be made simple and a cost thereof can be advantageously obtained.

Furthermore, the spring 23 can absorb a vibration and eliminate a play of the clutch arm 22, so that a feeling of a quality can be improved.

Moreover, since the clutch arm 22 axially slides along the arm shaft 26 in parallel to the pedal shaft 3, the push rod lever 15 can be smoothly slidden on the pedal shaft 3 in an axial direction, so that the clutch operation can be smoothly performed.

In this case, a cylindrical collar axially deforming when the load is over a predetermined value may be used in place of the spring 23 mentioned above, and in this case, it is preferable a start of the deformation such as a slit in the collar or the like is provided in order to axially deform over the predetermined load.

Further, an electromagnetic clutch can be used for the clutch means 18 other than the means mentioned above, and a collision sensor normally mounted in the vehicle and operating an air bag apparatus can be commonly used for the collision detecting means 27.

Still further, in the embodiment mentioned above, the push rod lever 15 end is formed to be slidable, however, the pedal arm 2 end may be formed to be slidable.

Figure 3:
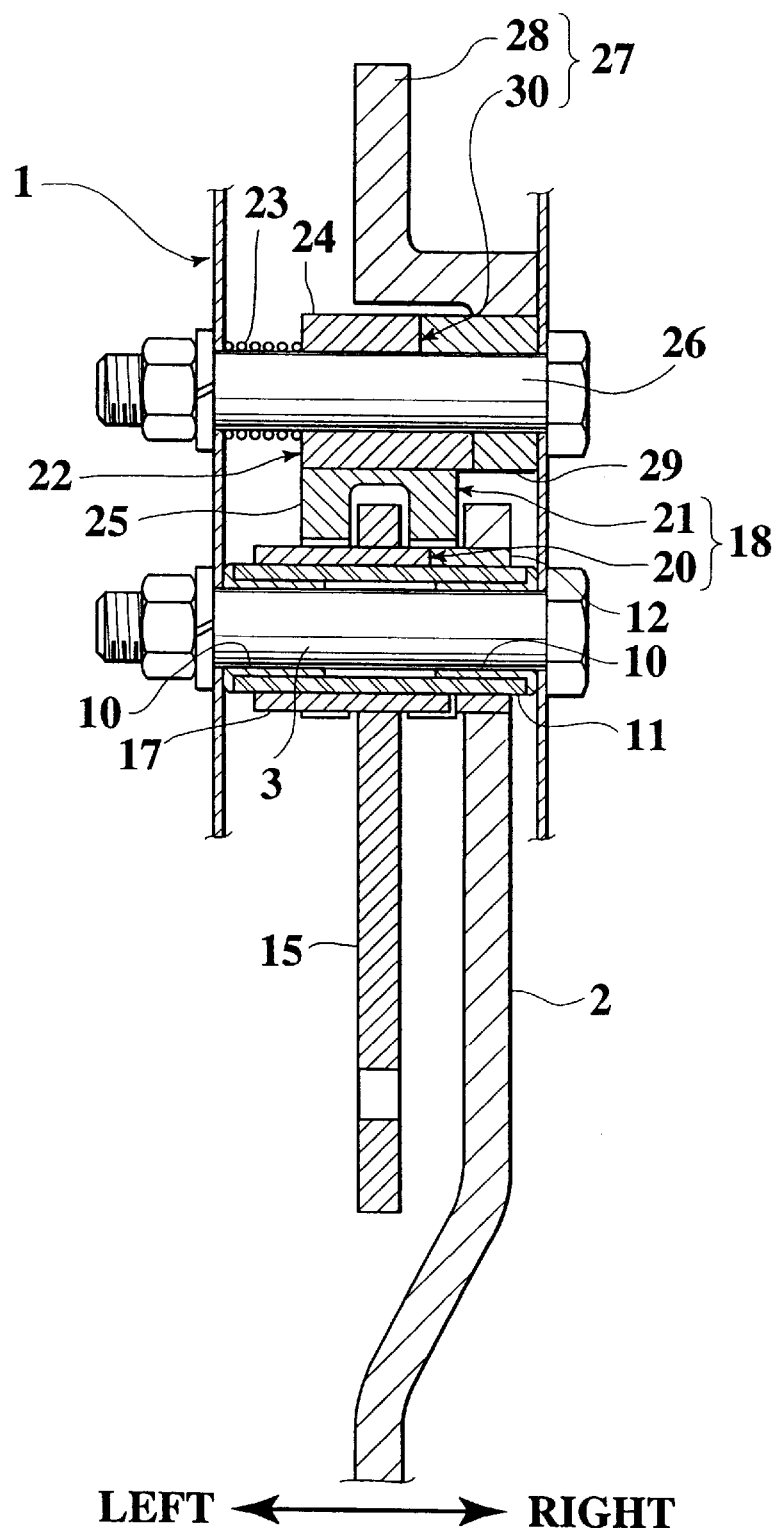
FIG. 3 is a cross sectional view of the embodiment.
Figure 4:
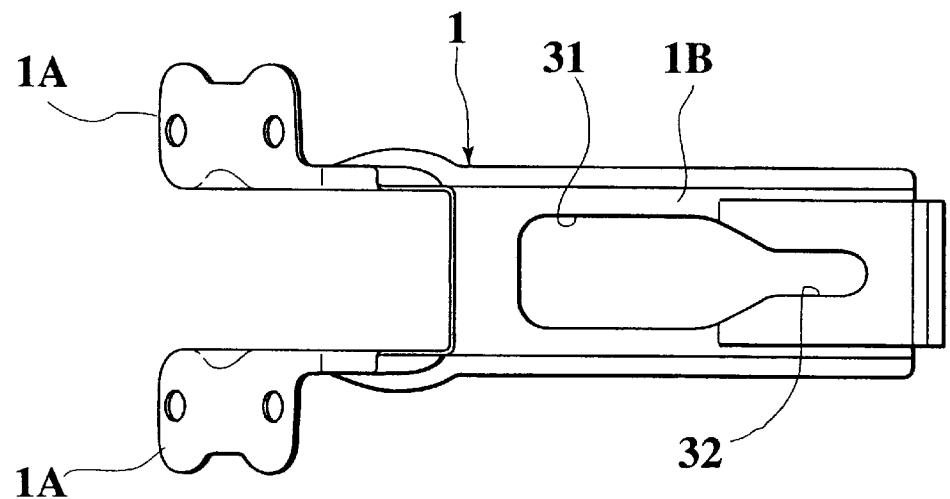
FIG. 4 is a plan view which shows a pedal bracket in accordance with the embodiment.

In this case, the push rod lever 15 in FIG. 3 is downward extended to be a pedal arm, and the pedal arm 2 in FIG. 3 is shortened to be a push rod lever.

Figure 5:
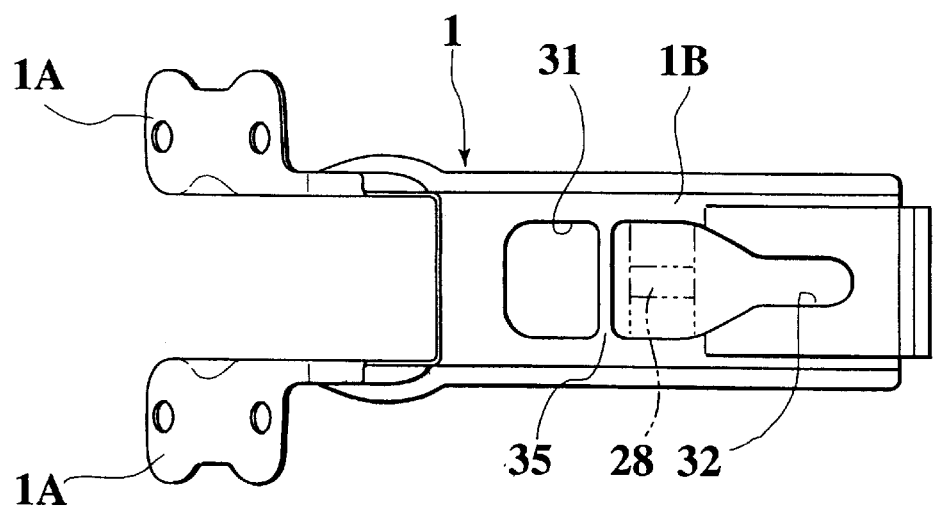
FIG. 5 is a plan view which shows a pedal bracket of a second embodiment in accordance with the present invention.

FIG. 5 shows a second embodiment in accordance with the present invention. In this embodiment, in the upper wall 1B of the pedal bracket 1 in accordance with the first embodiment shown in FIGS. 1 to 4, a restriction portion 35 for restricting a forward rotation of the collision detecting lever 28 at a normal state, and for allowing the forward rotation of the collision detecting lever 28 when the rotational force is over a predetermined load is provided near the front portion of the collision detecting lever 28 upward projecting from the window portion 31 of the pedal bracket 1.

Accordingly, in accordance with the embodiment, since the restricting portion 35 can restrict the rotation of the collision detecting lever 28 at a time when the brake pedal apparatus is assembled to the vehicle, is transported and is conveyed, the collision detecting lever 28 can be securely held at an initial set position. On the contrary, at a time of a front collision of the vehicle, since the rotation restriction by the restricting portion 35 can be removed when the rotational force of the collision detecting lever 28 is over a predetermined load, the collision detection lever 28 can be forward rotated with no problem and the clutch mechanism mentioned above can be operated.

In this case, in this embodiment, the restricting portion 35 is formed in a bridge shape all around both side edges of the window portion 31 in the pedal bracket 1, as an example, however, the restricting portion 35 may be formed such that a projecting portion is formed toward a center portion of an opening from both sides of the window portion 31.

Figure 6:
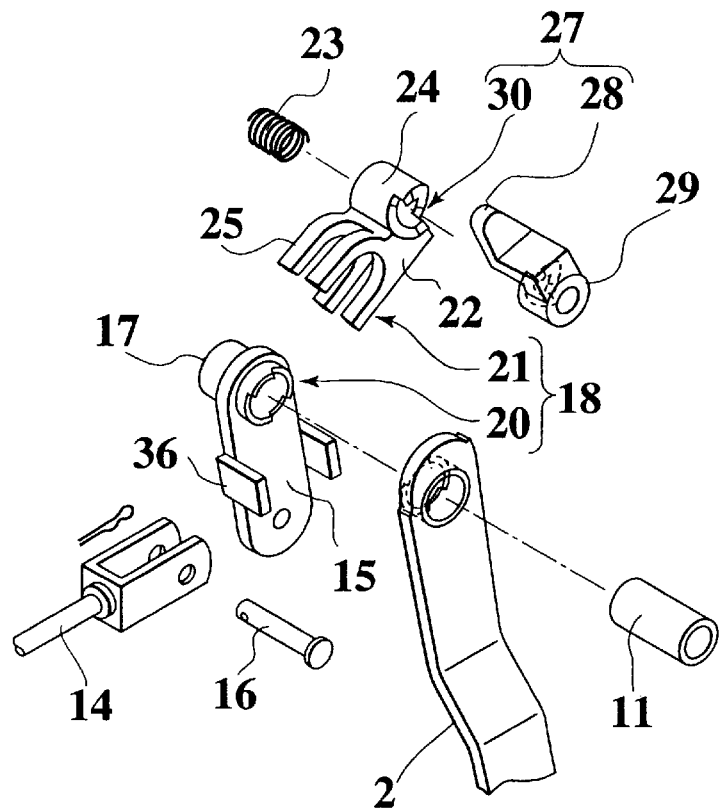
FIG. 6 is an exploded perspective view which shows a main portion of a third embodiment in accordance with the present invention.
Figure 7:
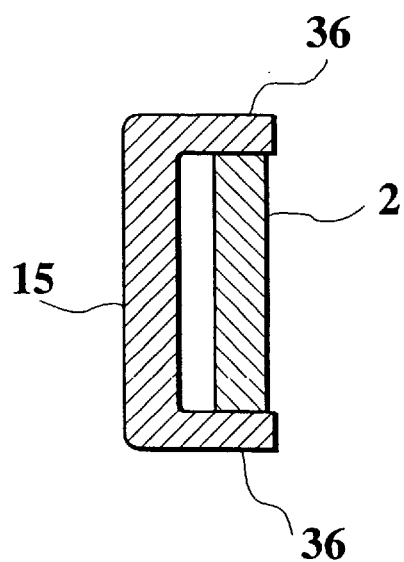
FIG. 7 is a cross sectional view which shows an engaging state by a hook portion shown in FIG. 6.

FIGS. 6 and 7 show a third embodiment of the present invention. In this embodiment, in the push rod lever 15 in accordance with the first embodiment shown in FIGS. 1 to 4, there is provided a hook portion 36 which connects the front and rear side edges of the pedal arm 2 by engaging with them at a normal state, and is removed an engagement at a time of disconnecting the push rod lever 15 from the pedal arm 2 by the clutch means 18.

Accordingly, in accordance with the structure of this embodiment, the connection strength between the pedal arm 2 and the push rod lever 15 at a normal state can be increased.

In this embodiment, the hook portion 36 is formed close to the push rod 15, however, it can be of course formed in the pedal arm 2.

What is claimed is:

1. A brake pedal apparatus for an automotive vehicle, comprising:

a pedal bracket fixed to a dash panel;

a pedal arm pivotally supported on said pedal bracket;

a push rod lever pivotally supported on said pedal bracket said push rod lever being connected to a push rod; and a clutch mechanism which is arranged between the pedal arm and the push rod lever, which normally connects said pedal arm to the push rod lever, and which disconnects the pedal arm from the push lever when a collision detecting sensor detects a collision.

2. A brake pedal apparatus as recited in claim 1, wherein the pedal arm and the push rod lever are pivotally supported on a pedal shaft supported in the pedal bracket.

3. A brake pedal apparatus as recited in claim 2, wherein one of the push rod lever and the pedal arm is pivotally supported on a pedal shaft so as to be slidable axially along the pedal shaft.

4. A brake pedal apparatus for an automotive vehicle, comprising:

a pedal bracket fixed to a dash panel;

a pedal arm pivotally supported on said pedal bracket;

a push rod lever pivotally supported on said pedal bracket said push rod lever being connected to a push rod; and a clutch mechanism which normally connects said pedal arm to the push rod lever, and which disconnects the pedal arm from the push rod lever when a collision detecting sensor detects a collision;

wherein the pedal arm and the push rod lever are pivotally supported on a pedal shaft supported in the pedal bracket;

wherein one of the push rod lever and the pedal arm is pivotally supported on a pedal shaft so as to be slidable axially along the pedal shaft;

wherein said clutch mechanism comprises:

engagement portions which are respectively formed in the pedal arm and the push rod lever and which engage each other, and a positioning mechanism which positions one of the pedal arm and the push rod with respect to the other so that a first state is established wherein said engagement portions on the push rod lever and the pedal arm normally engage each other and which positions the one of the pedal arm and the push rod with respect to the other so that a second state is established wherein the engagement portions disengage from each other when a load over a predetermined value is deformingly applied to the vehicle and the positioning mechanism displaces the one of the push rod lever and the pedal arm to move in an axial direction along the pedal shaft.

5. A brake pedal apparatus as recited in claim 4, wherein the pedal arm and the push rod lever respectively have boss portions formed thereon and wherein said engagement portions are formed on respective end surfaces of the boss portions formed on the pedal arm and the push rod lever.

6. A brake pedal apparatus as recited in claim 4, wherein said clutch mechanism comprises a hook portion formed on one of the pedal arm and the push rod lever, the hook portion engaging a side edge of the other of the pedal arm and the push rod lever.

7. A brake pedal apparatus as recited in claim 4, wherein said positioning mechanism comprises:
   a clutch arm which is pivotally supported by an arm shaft supported in the pedal bracket in parallel to the pedal shaft, said clutch arm being slidable along the arm shaft and operatively connected to the one of the push rod lever and the pedal arm, and
   a positioning member which displaces said clutch arm to a predetermined axial position on the arm shaft in response to a deformation load over a predetermined value being applied to the automotive vehicle and causes the positioning mechanism to induce the second state wherein the engagement portions on the pedal arm and the push rod lever disengage from one another.

8. A brake pedal apparatus as recited in claim 4, wherein said collision detecting sensor detects rearward movement of the pedal bracket due to a collision load caused by frontal vehicle impact.

9. A brake pedal apparatus as recited in claim 7, wherein said collision detecting sensor comprises:
   a collision detecting lever which projects from the pedal bracket and which is adapted to be rotated by engaging a vehicle body part located closer to a vehicle cabin than the dash panel with respect to rearward movement of the pedal bracket due to the collision load, and
   a cam mechanism which, in response to rotation of the collision detecting lever, moves said positioning member to the predetermined axial position.

10. A brake pedal apparatus as recited in claim 9, wherein said collision detecting lever is pivotally supported on the arm shaft and projects beyond the pedal shaft to be rotated by engagement with a lower surface portion of a dash upper panel which forms part of the dash panel and which extends toward the vehicle cabin above a dash lower panel, which also forms part of the dash panel, in accordance with a rearward movement of the pedal bracket due to the collision load.

11. A brake pedal apparatus as recited in claim 9, wherein the clutch arm and the collision detecting lever respectively have boss portions formed thereon, and wherein said cam mechanism comprises cam surfaces which are respectively formed on end surfaces of the boss portions of the clutch arm and the collision detecting lever, which engaged each other, and which displace the clutch arm in an axial direction along the arm shaft against a positioning force of a biasing member in response to the rotation of the collision detecting lever.

12. A brake pedal apparatus as recited in claim 9, wherein the pedal bracket is provided with a restricting portion which is disposed near the collision detecting lever and which prevents said collision detecting lever from rotating until a rotating force in excess of a predetermined value is applied thereto.

13. A brake pedal apparatus as recited in claim 7, wherein said biasing member comprises a spring urging the clutch arm in an axial direction along the arm shaft.

14. A brake pedal apparatus as recited in claim 4, wherein a return spring is disposed between said pedal bracket and the push rod lever so as to apply a rotational force to the pedal arm through the push rod lever.

15. A brake pedal apparatus as recited in claim 10, wherein the pedal bracket is fixed to at least the dash lower panel, and wherein the collision detecting lever engages the dash upper panel.

16. A brake pedal apparatus as recited in claim 4, wherein said dash panel comprises:
   a dash lower panel; and
   a dash upper panel connected to said dash lower panel,
   the dash upper panel projecting toward an interior of a cabin forming part of the vehicle, and
   wherein the pedal bracket is mounted so as to extend between the dash lower panel and the dash upper panel and is arranged to move rearwardly with respect to the dash upper panel at a time of rearward movement of said pedal bracket due to collision load.

17. A system including a brake pedal apparatus for an automotive vehicle, comprising:
   a pedal bracket fixed to a dash panel;
   a pedal arm pivotally supported on said pedal bracket;
   a push rod lever pivotally supported on said pedal bracket and connected to a servo device by way of a push rod;
   a collision detecting sensor adapted to detect a vehicle deforming collision load being produced as a result of a vehicle collision; and
   a clutch mechanism which is disposed between the pedal arm and the push rod lever, and which normally connects said pedal arm to the push rod lever for synchronous movement therewith, said clutch mechanism being responsive to the collision sensor so as to disconnect the pedal arm from the push rod lever when said collision detecting sensor detects a collision.

18. A system including a brake pedal apparatus for an automotive vehicle, comprising:
   a pedal bracket fixed to a dash panel;
   a pedal arm pivotally supported on said pedal bracket;
   a push rod lever pivotally supported on said pedal bracket and connected to a servo device by way of a push rod;
   a collision sensor adapted to detect a vehicle deforming collision load being produced as a result of a vehicle collision; and
   a clutch mechanism which normally connects said pedal arm to the push rod lever for synchronous movement therewith, said clutch mechanism being responsive to the collision sensor so as to disconnect the pedal arm from the push rod lever when said collision sensor detects a collision;
   wherein said collision detecting sensor comprises:
      a collision detecting lever which projects from the pedal bracket and is rotated by engagement with a vehicle body part which is located in a predetermined spatial relationship with a dash panel which forms part of the vehicle; and
      a cam mechanism which operatively connected with the collision detecting lever and which disconnects the pedal arm from the push rod lever in response to rotation of the collision detecting lever.

19. A system including a brake pedal apparatus for an automotive vehicle as set forth in claim 18, wherein:
   the dash panel comprises a dash lower panel and a dash upper panel, the pedal bracket is fixed to at least the dash lower panel, and the collision detecting lever engages the dash upper panel and is caused to project toward a vehicle cabin, which forms part of the vehicle, at a time of a rearward movement of said pedal bracket due to a collision load being applied to the vehicle and causing deformation of the dash panel.

20. A brake pedal apparatus for an automotive vehicle comprising:

a pedal bracket fixed to a dash panel;

a pedal arm pivotally supported on said pedal bracket;

a push rod lever pivotally supported on said pedal bracket said push rod lever being connected to a push rod; and a clutch mechanism which normally connects said pedal arm to the push rod lever, and which disconnects the pedal arm from the push rod lever when a collision detecting sensor detects a collision; and wherein:

the pedal arm and the push rod lever are pivotally supported on a pedal shaft which is supported in the pedal bracket;

the clutch mechanism is arranged between the pedal arm and the push rod lever; and the pedal arm and the push rod lever are relatively movable with respect to one another along the pedal shaft between a first state wherein the clutch mechanism engages the pedal arm and the push rod lever and a second state in which the clutch mechanism disengages the pedal arm and the push rod lever.

21. A brake pedal apparatus for an automotive vehicle as recited in claim 20, wherein the clutch mechanism includes an engage portion which engages the pedal arm with the push rod lever in a normal condition, and a moving portion which disengages the pedal arm and the push rod lever by axially moving the pedal arm and the push rod lever apart in response to the collision sensor detecting a vehicle deforming collision load.

* * * * *